B. G. MARTIN.
Ice-Cream Freezer.

No. 100,305.  Patented March 1, 1870.

Witnesses:

Inventor:
B. G. Martin
per Munn & Co
Attorneys

United States Patent Office.

BENJAMIN GREEN MARTIN, OF WILLIAMSBURG, NEW YORK.

Letters Patent No. 100,305, dated March 1, 1870; antedated February 14, 1870.

IMPROVED ICE-CREAM FREEZER.

The Schedule referred to in these Letters Patent and making part of the same.

*To all whom it may concern:*

Be it known that I, BENJAMIN GREEN MARTIN, of Williamsburg, in the county of Kings, and State of New York, have invented a new and improved Ice-Cream Freezer; and I do hereby declare that the following is a full, clear, and exact description thereof, which will enable others skilled in the art to make and use the same, reference being had to the accompanying drawings forming a part of this specification.

Similar letters of reference indicate corresponding parts.

Figure 1:
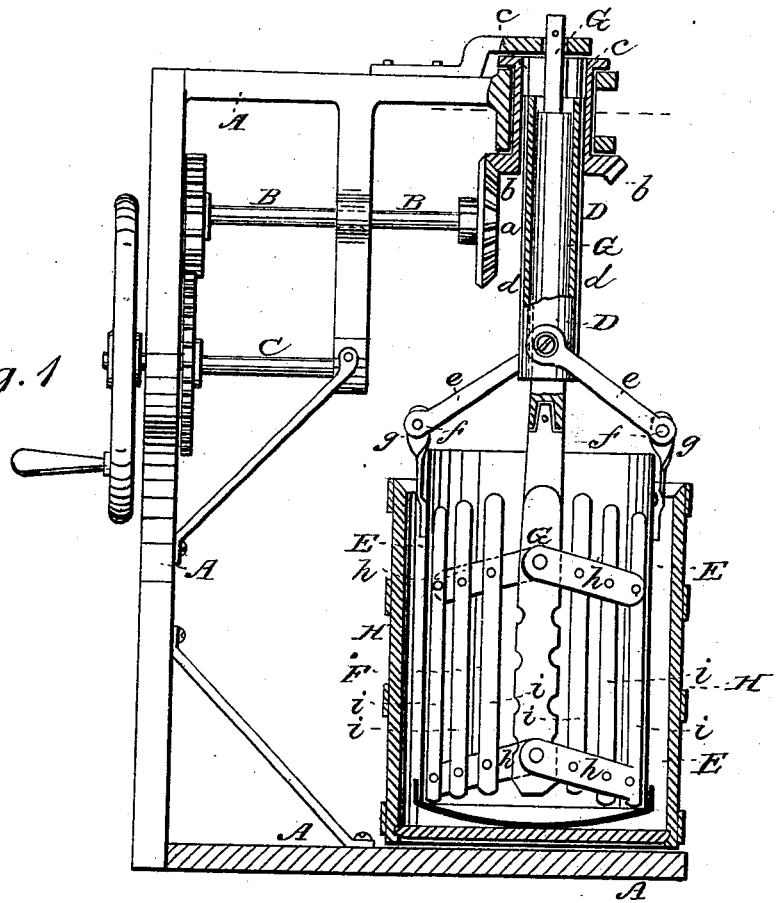
Figure 1 represents a side elevation, partly in section, of my improved ice-cream freezer.
Figure 2:
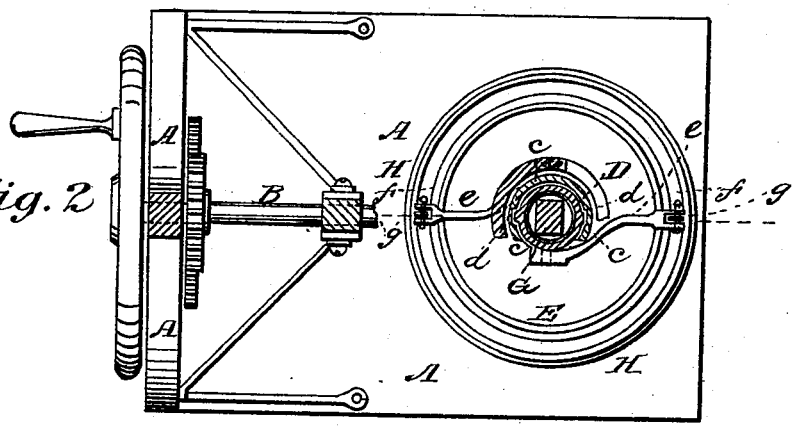
Figure 2 is a plan or top view, partly in section, of the same.

This invention relates to a new machine which can be used for making ice-cream, and also for a churn for the production of butter.

The invention consists in the general construction of the stirrer or dasher, which will adjust itself to any size of freezing vessel or churn.

Also, in suspending the said vessel or churn by pivoted arms from an up-and-down adjustable rotating shaft.

A in the drawing represents the frame of my improved machine. In it are the bearings of the horizontal driving-shaft B, which carries a pinion, *a*, that meshes into another pinion, *b*, as shown.

The pinion *b* has a hollow shank, *c*, which is hung vertically in the upper part of the frame, as shown.

The shaft B receives rotary motion either directly or from another suitable driving-shaft, C.

D is a hollow vertical shaft, having a groove or feather, *d*, and fitted with its upper end into the pinion *b*, and its shank so that it can slide up and down therein, and revolve with the same.

To the lower part of the shaft D are pivoted two arms *e e*, which have their lower ends connected by pins *f* with ears *g*, that project from the freezing-vessel or churn E.

The arms can be spread or contracted to hold larger or smaller vessels, and the shaft D will adjust itself to vessels of suitable height.

When the shaft B is revolved, it will turn the shaft D, and with it the vessel E.

The stirrer J is fastened to a vertical shaft, G, which is fitted through the hollow shaft D, as shown.

The stirrer consists of two or more sections. Each section is made of two or more horizontal braces *h h*, and of a suitable number of vertical bars *i i*.

The braces *h* are pivoted to the shaft G or to a lower extension of the same, and the bars *i* are pivoted to the braces, as shown. There is a kind of flexible stirrer provided, which can be made narrow for small, and larger for large vessels.

By being pressed upon the bottom of the vessel E the outermost bars *i* will be raised, and will thereby bring the bars *h* nearer to a horizontal position, so as to carry the outer bar *i* against the side of the vessel. Such outer bars will then serve as scrapers to work against the side of the vessel.

The shaft G may be left entirely stationary while the shaft D is rotated with the vessel E; or G may, by carrying a pinion, be revolved in the opposite direction to D, whereby quicker action will be obtained.

A stationary vessel, H, contains the rotating vessel E, to hold the ice or other freezing matter.

Having thus described my invention,

What I claim as new, and desire to secure by Letters Patent, is—

1. The up-and-down adjustable rotating shaft D, combined with the pivoted arms *e e*, to support the rotating vessel E, substantially as herein shown and described.

2. The stirrer F, consisting of the pivoted arms *h* and vertical bars *i*, and made self-adjusting, substantially as herein shown and described.

BENJ. GREEN MARTIN.

Witnesses:
GEO. W. MABEE,
ALEX. F. ROBERTS.